United States Patent [19]

Moens

[11] 4,075,380

[45] Feb. 21, 1978

[54] CONSTRUCTION PANELS

[75] Inventor: Joris Moens, Kortrijk, Belgium

[73] Assignee: N. V. Bekaert S. A., Zwevegem, Belgium

[21] Appl. No.: 513,832

[22] Filed: Oct. 10, 1974

[30] Foreign Application Priority Data

Oct. 12, 1973 United Kingdom ............... 47840/73

[51] Int. Cl.[2] ............................................ B32B 3/10

[52] U.S. Cl. .................................... 428/140; 52/615; 428/71; 428/119; 428/320; 428/321; 428/322

[58] Field of Search ............... 161/159, 160, 170, 213, 161/109, 112, 113, 114, 115, 41; 428/119, 120, 138, 134, 140, 309, 320, 321, 322, 71, 16, 172; 52/659, 615, 612; 264/228, DIG. 43, DIG. 44

[56] References Cited

U.S. PATENT DOCUMENTS

| | | | |
|---|---|---|---|
| 2,410,022 | 10/1946 | Dumais | 52/408 |
| 2,850,890 | 9/1958 | Rubenstein | 161/161 |
| 3,024,574 | 3/1963 | Sahlstrom | 52/303 |
| 3,104,196 | 9/1963 | Shannon | 161/271 |
| 3,192,098 | 6/1965 | Phillips | 161/41 |
| 3,217,375 | 11/1965 | Kinnard | 264/228 |
| 3,512,327 | 5/1970 | Padura | 52/612 |
| 3,728,211 | 4/1973 | Ball et al. | 161/170 |
| 3,832,264 | 8/1974 | Barnette | 161/41 |
| 3,841,958 | 10/1974 | Delorme | 428/117 |

FOREIGN PATENT DOCUMENTS

| | | |
|---|---|---|
| 1,359,729 | 2/1969 | France. |
| 1,942,226 | 2/1970 | Germany. |
| 998,094 | 7/1965 | United Kingdom. |

*Primary Examiner*—George F. Lesmes
*Assistant Examiner*—S. S. Silverman
*Attorney, Agent, or Firm*—Shlesinger, Arkwright, Garvey & Dinsmore

[57] ABSTRACT

A construction panel comprising two substantially parallel sheets of material interconnected by bridging portions integral with the sheets, the sheets and bridging portions being formed by a moldable hard-setting material reinforced by a plurality of randomly oriented metal fibers distributed therein. Also described is a method for making such a panel.

9 Claims, 6 Drawing Figures

CONSTRUCTION PANELS

Figure 1:
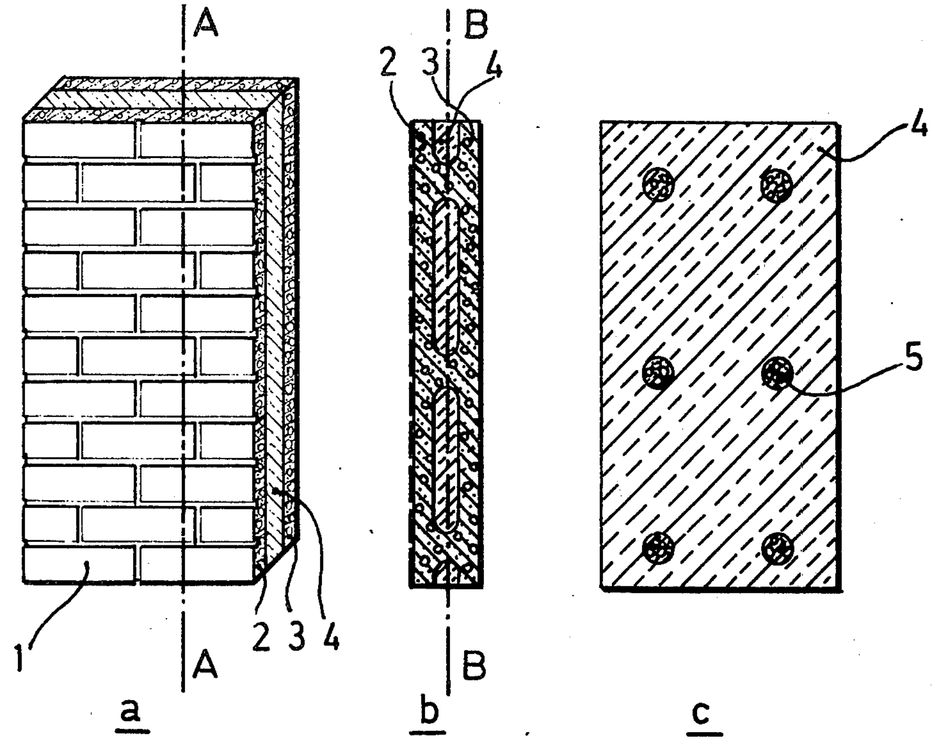

This invention relates to construction panels and to a method of making such panels.

According to the present invention there is provided a construction panel comprising two substantially parallel sheets of material interconnected by bridging portions, each of said bridging portions forming an integral body of a same material at least with the regions of the said sheets at the respective ends of the bridging portion, said integral body being made of moldable hard-setting material internally reinforced by a multiplicity of randomly oriented metal fibers distributed therein.

The said moldable material may be, for example, mortar or concrete.

When the said moldable material is mortar or concrete, the reinforcing fibers are preferably present in a concentration of from 1-6% by volume. The fibers themselves are preferably made from iron or steel and preferably have a modulus of elasticity which is greater than 10,000 kg/mm$^2$. The cross-sectional area of the fibers is preferably less than 1 mm$^2$ and the cross-section itself is preferably circular. Preferred length to equivalent diameter ratios (aspect ratio) of the fibers are in the range of from 50:1 and 200:1.

The sheets of the construction panel are preferably made of concrete which may if desired be reinforced, for example by iron or steel rods or by fibers similar to those used to reinforce the bridging portions.

The space between the sheets may be left open or may be occupied by, for example, a thermal and/or acoustic insulating material, for example expanded polystyrene or hard polyurethane foam, or by a fire retardant material.

At least one of the exterior faces of the construction panels may be provided with a decorative finish. Such finish can be formed in the surface of the panel or can be applied thereto, for example the panel could be rendered, tiled, or coated with a layer of plastics material or wood.

The sum of the cross-sectional areas of the said bridging portions, measured midway between the sheets, is preferably in the range of from 1-25% of the area of the panel.

The present invention also provides a method of making a construction panel as set forth above, including the step of integrally forming said bridging portions and said sheet regions at the respective ends of the bridging portions by introducing a mix of a moldable hard-setting material containing said randomly oriented reinforcing fibers into and around apertures and/or perimetric slots in an intermediate layer of material which separates said parallel sheets of material, and allowing said mix to harden.

The method preferably includes the step of forming at least one of the said sheets of material, although this is not essential.

One preferred method of forming construction panels in accordance with the present invention comprises the steps of placing a layer of moldable hard-setting material in a mold, placing said intermediate layer on said hard-setting material, filling said apertures and/or slots with said mix, and applying a second layer of a moldable hard-setting material over said intermediate layer, said layers of hard-setting material on each side of said intermediate layer forming, when set, said sheets.

Construction panels in accordance with the present invention may also be formed by applying a layer of a moldable hard-setting material to one side of said intermediate layer, filling said apertures and/or slots with said mix, and applying a second layer of moldable hard-setting material to the other side of said intermediate layer, said layers of hard-setting material on each side of said intermediate layer forming, when set, said sheets.

The said hard-setting materials forming the sheets may themselves be reinforced with wires like the said mix, and such materials will usually be concrete.

In some applications, it may be desired to remove the said intermediate layer. If such layer is formed from expanded polystyrene, this can readily be dissolved by chloroform. As an alternative, the intermediate layer can be made of a non-coherent nature, for example of granular or pulverulent material such as molding sand. In such cases the granular or pulverulent material will be laid on the first layer of hard-setting material and apertures or slots formed therein. After the material forming the sheets has set, the granular or pulverulent material can be removed, for example with compressed air.

The thickness of each of the said sheets of material will usually be in the range of from 1-3 cm, and the distance between the sheets will usually be in the range of from 0.5-10 cm.

Some embodiments of the invention will now be described by way of example and with reference to the accompanying drawings, in which:

FIG. 1*a* is a perspective view of a construction panel in accordance with the present invention;

FIG 1*b* is a cross-section taken in the plane A,A of FIG. 1*a;*

FIG. 1*c* is a section taken along line B—B of FIG. 1*b;*

Figure 2:
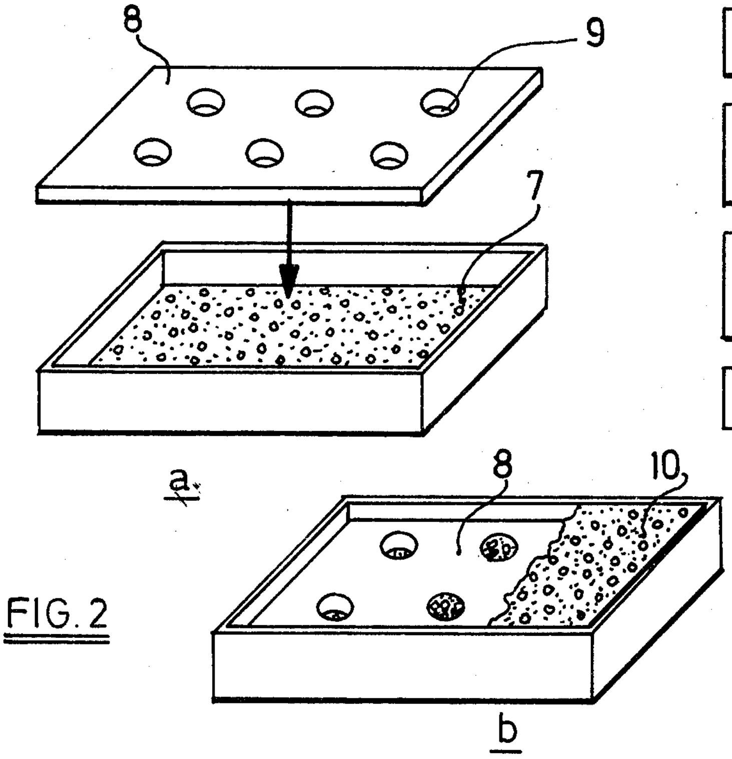

FIG. 2*a* shows a step in the manufacture of the construction panel shown in FIGS. 1*a,* 1*b* and 1*c;*

FIG. 2*b* shows another step in the manufacture of the construction panel; and

Figure 3:
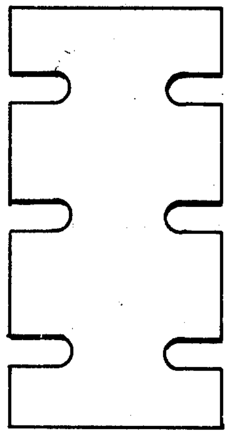

FIG. 3 shows an alternative intermediate layer for use in the construction panel shown in FIG. 1.

Referring to FIG. 1*a* of the drawings, there is shown a construction panel 1 which comprises two sheets 2 and 3 of material which are separated by an intermediate layer 4 of expanded polystyrene. As shown in FIG. 1*b,* the two sheets 2 and 3 are connected by bridging portions 5 which extend through circular apertures 9 in the intermediate layer 4. Sheets 2 and 3 and the bridging portions 5 are made from concrete reinforced with a multitude of randomly oriented metal fibers distributed therein (hereinafter referred to as "wire reinforced concrete").

The sheets 2 and 3 are each 2 cm thick and the distance between the two sheets is 4 cm. The sum of the cross-sectional areas of the bridging portions midway between the sheets (i.e., in the plane of the section B—B) is 4% of the area of the layer 4, which is equal to the area of the face of the contructional panel 1. By increasing the cross-sectional area of the bridging portions of a given panel, the structural strength thereof is increased. This additional strength is however obtained at the expense of the thermal insulating properties of the panel which are reduced. It is presently preferred to arrange for the sum of the cross-sectional areas of the bridging portions midway between the sheets to lie in the range of from 1-25% of the area of the panel. The cross-sectional area of a bridging portion midway between the sheets will typically be in the range of from 6–50 $cm^2$. Bridging portions 5 do not necessarily have to be circular.

The metal wires used in the wire reinforced concrete are made of hard drawn steel and have a circular cross-section which is less than 1 $mm^2$ in area. The length:diameter ratio of the wires lies in the range of from 50:1 to 200:1.

Referring to FIG. 2*a*, the construction panel of FIGS. 1*a*, 1*b* and 1*c* is formed as follows. A mold 6 is laid on a vibratory table and is filled with a layer 7 of wire reinforced concrete to a depth just greater than 2 cm. The layer is leveled by operating the vibratory table. Before the concrete sets, an intermediate layer 8 of expanded polystyrene is laid on top of the layer 7 and is pressed against it to obtain good adhesion with the concrete. Further wire reinforced concrete is then poured over layer 8 (as shown in FIG. 2*b*) until the apertures 9 are filled and the level of the layer 10 above layer 8 is just over 2 cm thick. The vibrator table is again actuated to ensure homogeneity between the wire reinforced concrete in the layer 7 and the wire reinforced concrete in the apertures 9. It should be noted that the entire operation is preferably carried out before any of the concrete sets.

When set, the construction panel is removed from mold 6.

The bottom of the mold is so shaped that one exterior face of the construction panel has the appearance of brickwork (as shown in FIG. 1). The brickwork may, if desired, be painted. It will be appreciated that both exterior faces of the construction panel could be decorated before the concrete sets.

Rather than allowing the concrete to set after the layer 10 has been leveled by the vibratory table, the surface layer 10 could be rendered or covered with, for example, tiles, plastics material or wood.

FIG. 3 shows an alternative intermediate layer 11 which is provided with perimetric slots 12 instead of apertures. It will be appreciated that an intermediate layer could have both slots and apertures.

If desired, the foam polystyrene of the intermediate layer could be dissolved with, for example, chloroform to leave the two sheets 2 and 4 separated only by bridging portions 5.

Although the construction panel described with reference to the drawing is planar, it could also be made with a curved configuration.

The length and width of the construction panels in accordance with the present invention will normally exceed 7 times the thickness of the panel.

As previously mentioned, it is by no means essential for the two outer sheets of a panel according to the invention to be reinforced with metal fibers like the bridging portions, so long as the sheet regions at the respective ends of the bridging portions (this is the sheet material which is at no greater distance from said portions, than the thickness of said portion) are so reinforced. For example, the sheets 2 and 3 of the illustrated panel could be of unreinforced concrete, or of concrete reinforced with metal bars or rods. In this case, the illustrated process of making the panel will be modified in that, having poured the layer 7 and laid the layer 8 on it, depressions are formed in the layer 7 via each of the apertures 9 (or slots 12) e.g., with a trowel, before the layer 7 has set. The apertures or slots and the depressions are then filled with wire reinforced concrete so that the wire reinforced concrete which enters the said depressions becomes part of the layer 7, and wire reinforced concrete is also heaped above each aperture or slot so as to become part of the layer 10 when the latter is poured.

While this invention has been described, it will be understood that it is capable of further modification, and this application is intended to cover any variations, uses and/or adaptations of the invention following in general, the principle of the invetnion and including such departures from the present disclosure as come within known or customary practice in the art to which the invention pertains, and as may be applied to the essential features hereinbefore set forth, as fall within the scope of the invention or the limits of the appended claims.

What is claimed is:

1. A construction panel comprising two substantially parallel sheets of concrete or mortar, said sheets being spaced apart and connected by bridging portions formed of concrete or mortar integral with said sheets, said bridging portions and at least the regions of said sheets at the respective ends of said bridging portions being reinforced with a multiplicity of randomly oriented metal fibers distributed therein, said sheets being otherwise substantially unreinforced, the cross sectional area of the bridging portions measured midway between said sheets comprising about 1–25% of the area of said panel, and a thermal insulating material filling the remainder of the volume between said sheets and surrounding said bridging portions.

2. A construction panel as claimed in claim 1, wherein said metal fibers are present in a concentration of from 1–6% by volume.

3. A construction panel as claimed in claim 1, wherein said metal fibers have a cross-sectional area not greater than 1 sq. mm.

4. A construction panel as claimed in claim 1, wherein said metal fibers are of circular cross-section and the length:diameter ratio thereof is in the range of from 50:1 to 200:1.

5. A construction panel as claimed in claim 1, wherein at least one exterior face of said panel is provided with a decorative finish.

6. A construction panel as claimed in claim 1, wherein at least one exterior face of said panel is rendered.

7. A construction panel as claimed in claim 1, wherein at least one face of said panel is tiled.

8. A construction panel as claimed in claim 1, wherein at least one exterior face of said panel is covered with a layer of plastics material.

9. A construction panel consisting essentially of two substantially parallel sheets of concrete or mortar, said sheets being spaced apart and connected by bridging portions formed of concrete or mortar integral with said sheets, said bridging portions and the regions of said sheets at the respective ends of said bridging portions being reinforced with a multiplicity of randomly oriented metal fibers distributed therein and said sheets being reinforced with metal rods or bars, said bridging portions being substantially free of metal rods or bars the cross sectional area of the bridging portions measured midway between said sheets comprising about 1–25% of the area of said panel, and a thermal insulating material filling the remainder of the volume between said sheets and surrounding said bridging portions.

* * * * *